No. 831,121. PATENTED SEPT. 18, 1906.
E. L. TROUP.
CAR WHEEL.
APPLICATION FILED DEC. 11, 1905.
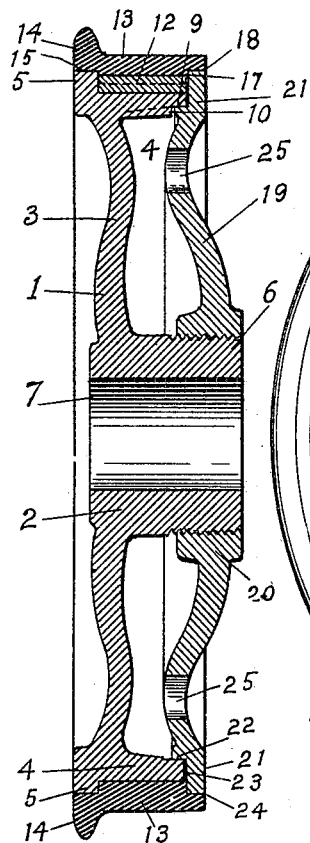
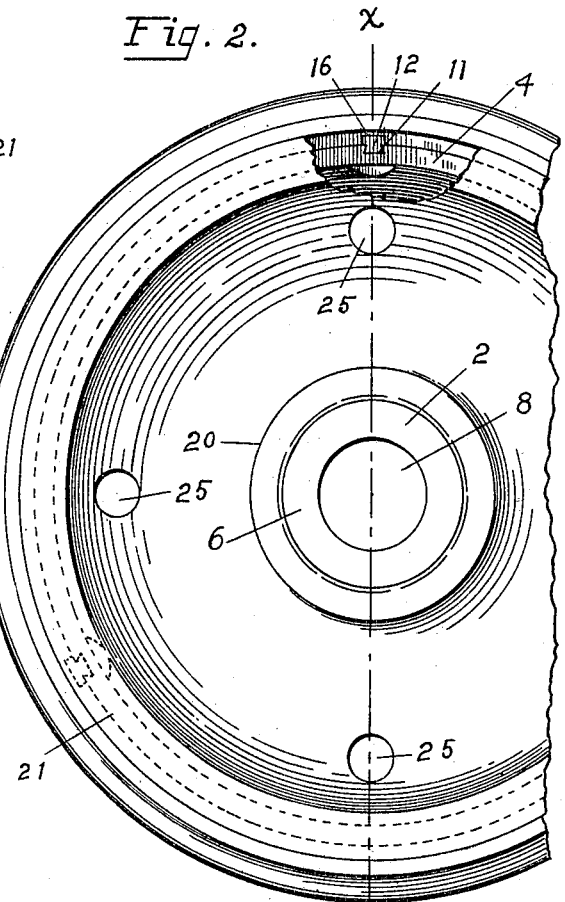
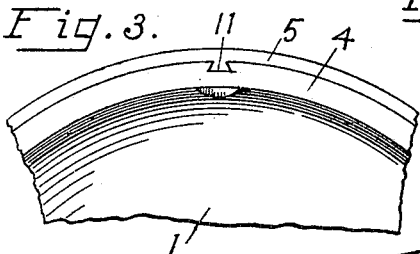
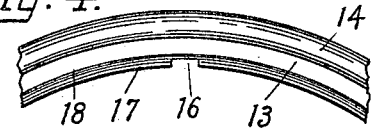
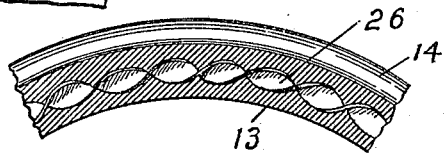
WITNESSES:
D. C. Walter
Grace Condrick
INVENTOR.
Edward L Troup
by Robt B Wilson
his Attorney

UNITED STATES PATENT OFFICE.

EDWARD L. TROUP, OF WAUSEON, OHIO.

CAR-WHEEL.

No. 831,121.     Specification of Letters Patent.     Patented Sept. 18, 1906.

Application filed December 11, 1905. Serial No. 291,359.

*To all whom it may concern:*

Be it known that I, EDWARD L. TROUP, a citizen of the United States, and a resident of Wauseon, in the county of Fulton and State of Ohio, have invented a new and useful Improvement in Car-Wheels, of which the following is a specification.

My invention relates to a car-wheel, and has for its object to provide a car-wheel with an attachable and detachable flanged rim or tire and with detachable means to securely lock the rim or tire thereon without the use of bolts, whereby the rim or tire may be readily removed from or attached to the body of the wheel without removing the wheel from the axle.

A further object is to provide a car-wheel with a chilled or hardened rim that is cast or formed separately from the body of the wheel, whereby the body of the wheel after being separately cast may be reheated and gradually cooled to prevent the stress and breakage arising from unequal shrinkage without affecting the chill of the rim.

A further object is to provide a car-wheel with a detachable rim that is formed of either cast or wrought metal or partly of both.

I accomplish these objects by constructing a car-wheel in separate parts that are readily assembled or separated, as hereinafter described and illustrated in the drawings, in which—

Figure 1 is a view in diametric section on line $x\ x$ of Fig. 2 of a car-wheel constructed and assembled in accordance with my invention. Fig. 2 is a view in side elevation of the same, partly broken away. Fig. 3 shows a broken-away portion of the rim of the wheel with the tire removed. Fig. 4 shows a broken-away portion of a wrought-metal tire, and Fig. 5 shows a cast tire having a wrought-metal core.

In the drawings, 1 represents the body of a wheel constructed in accordance with my invention, in which 2 is the hub, 3 a web integral with and concentric to one end portion of the hub, and 4 a rim integral with the web and concentric to the hub, having a concentric shoulder-flange 5 at one end projecting radially beyond the circumference of the rim and partly outside of the plane of the end of the hub with which the web 3 is integral. The hub 2 is provided with an extension 6, that is outwardly threaded and with a bore 7, that is of a diameter requiring the wheel to be forced by great pressure onto the axle 8.

The rim 4 at the side opposite to the flange 5 projects over the threaded extension of the hub and is provided with a concentric rabbet forming the shoulders 9 and 10. The rim 4 is also provided with a transverse dovetail groove 11, extending across the face of the rim to the flange 5, in which is mounted the key 12, having a portion projecting radially from the rim.

On the rim 4 is mounted a tire 13, having a concentric rim-flange 14 on one side, which is rounded and curved into the tread of the tire, and concentrically opposite thereto on the inner portion an annular squared rabbet 15, adapting the tire to fit over and shoulder against the flange 5 with the flange side of the tire flush with outer side of flange. The tire has an inner diameter adapting it for an easy drive fit on the rim 4 of the body of the wheel, and to lock the tire against circumferential movement of the rim the tire is provided with a transverse incut 16, adapted to receive the radially-projecting portion of the key 12. The tire when mounted on the rim has a portion that extends beyond the rim on the side opposite the flange 5, which is provided with a rabbet, forming shoulders 17 and 18. To secure the tire on the rim, there is provided a detachable disk 19, having a central hub 20, bored and internally threaded to run onto the threaded end portion 6 of the main hub 2, and a concentric rim 21, rabbeted and faced to form concentric shoulders 22, 23, and 24, respectively, and having an outer diameter adapting the inner portion of the rim to enter the rabbet of the tire and shoulder against the shoulders 17 and 18. Thus constructed when the tire is mounted on the rim 4 and the disk 19 is run in on the hub 2 until the rim is compressed and shouldered against the rim 4 and the tire the tire is firmly secured on the rim 4 of the main wheel, and the tire being locked by one or more keys 12 against circumferential movement on the rim there is no tendency in the running of the wheel in either direction to screw up or unscrew the disk. To attach or detach the disk 19, it is provided with the alined radial apertures 25 in the disked web 26 of the disk for the ready attachment of a suitable wrench (not shown) having lateral prongs adapted to enter the apertures.

In car-wheels thus constructed it is apparent that the tendency of the flanges is to retain the tires on the rim of the wheel-body and to prevent sidewise pressure of the rim against the disk and that so constructed a defective tire may be readily removed from the wheel-rim without removing the axle from the truck or the wheel from the axle by first removing the axle-box and the disk, and by raising the wheel from the track the tire may then be readily driven from the wheel-rim and a new tire substituted therefor.

On wheels thus constructed the tires used may be either welded tires formed of wrought-metal bars or billets which have been passed through rolls adapted to form the flange and rabbets or cast in suitable molds adapted to chill the outer face. The tires preferably used, however, are cast with a twisted wrought-metal core 26, as shown in Fig. 5, by a process that produces a smooth inner face without chilling and a true inner circle of the required diameter for the rim of the wheel without machining, which process is made the subject of a separate application.

By providing a detachable tire the difficult process of casting an entire wheel having a chilled tread is avoided, and the body of the wheel, with the chilling process eliminated, is more readily and cheaply cast and the shrinkage more readily controlled. In wheels having integral tires the body of the wheel is rendered practically useless when the tire portion becomes worn or defective from use, whereas by my construction it is made available for use during much longer periods of time.

What I claim to be new is—

In a car-wheel, the combination of a wheel-body having an externally-threaded hub extension on one side, and a rim portion concentric to the hub provided with a concentric radial shoulder-flange on one side and an inner rabbet on the opposite side; a tire adapted to be mounted on and detached from the rim, said tire having a circumferential flange and an inner rabbet opposite and concentric to the flange on one side, adapting the tire to fit over and shoulder against the flange of the rim, and having a portion extending beyond the rim on the opposite side provided with an inner rabbeted shoulder; and a locking and retaining disk having an internally-threaded hub adapted to be run on the threaded extension of the hub of the wheel-body, and a rabbeted concentric rim portion adapted to shoulder against both the rim and the tire; and means to lock the tire against circumferential movement on the rim.

In witness whereof I have hereunto signed my name, in the presence of two subscribing witnesses, this 10th day of November, 1905.

EDWARD L. TROUP.

Witnesses:
S. A. MACOMBER,
ANNA M. FRIEDRICHS.